United States Patent [19]
Komori et al.

[11] Patent Number: 5,715,389
[45] Date of Patent: Feb. 3, 1998

[54] ON-LINE MONITORING SYSTEM FOR COMPUTER SYSTEM

[75] Inventors: Naoki Komori, Tokyo; Akio Morita, Saitama-ken; Katsuaki Suzuki, Asaka, all of Japan

[73] Assignee: Honda Giken Kogyo Kabushikikaisha, Tokyo, Japan

[21] Appl. No.: 815,549

[22] Filed: Mar. 12, 1997

Related U.S. Application Data

[63] Continuation of Ser. No. 189,065, Jan. 27, 1994, abandoned.

[30] Foreign Application Priority Data

Jan. 29, 1993 [JP] Japan .................. 5-013755

[51] Int. Cl.$^6$ .................................. G06F 15/32
[52] U.S. Cl. .................................. 395/184.01
[58] Field of Search ............ 395/184.01; 371/48; 364/551.01, 265.6, 266.4, 267.4, 270, 921.8, 943.9

[56] References Cited

U.S. PATENT DOCUMENTS

| | | | |
|---|---|---|---|
| 4,112,264 | 9/1978 | Abramson et al. | 179/175.3 R |
| 4,197,427 | 4/1980 | Hutcheson et al. | 179/18 FC |
| 4,231,087 | 10/1980 | Hunsberger et al. | 364/200 |
| 4,545,011 | 10/1985 | Lyon et al. | 364/200 |
| 4,858,152 | 8/1989 | Estes | 364/550 |
| 4,905,171 | 2/1990 | Kiel et al. | 364/551.01 |
| 4,930,093 | 5/1990 | Houser et al. | 364/551.01 |
| 5,095,421 | 3/1992 | Freund | 395/650 |
| 5,107,450 | 4/1992 | Lawrenz | 364/569 |
| 5,283,868 | 2/1994 | Baker et al. | 395/200 |
| 5,325,517 | 6/1994 | Baker et al. | 395/575 |
| 5,331,574 | 7/1994 | Temoshenko et al. | 364/551.01 |
| 5,577,197 | 11/1996 | Beck | 395/183.04 |

FOREIGN PATENT DOCUMENTS 62-233855  10/1987  Japan ................ G06F 11/30

*Primary Examiner*—Robert W. Beausoliel, Jr.
*Assistant Examiner*—Stephen C. Elmore
*Attorney, Agent, or Firm*—Fish & Richardson P.C.

[57] ABSTRACT

According to the present invention, an on-line monitoring system which detects faults of one or more applications of the computer system comprises monitoring means for instructing each on-line control means included in the applications to execute routine processing for application programs periodically, and in a case that the time required for the routine processing is longer than a predetermined time, the monitoring system decides that a fault which deteriorates application functions or a fall in processing efficiency occurs. According to the present invention comprising such configuration, the monitoring means instructs each on-line control means included in a plurality of applications to execute the routine processing for application programs periodically, and in the case that the time required for the routine processing is longer than a predetermined time, the monitoring system decides that a fault which deteriorates application functions or a fall in processing efficiency occurs, so that the large fault treated before it is conspicuous.

4 Claims, 3 Drawing Sheets

ON-LINE MONITORING SYSTEM FOR COMPUTER SYSTEM

This is a continuation of application Ser. No. 08/189,065, filed Jan. 27, 1994, now abandoned.

BACKGROUND OF THE INVENTION

1. Field of the Invention

The present invention relates to an on-line monitoring system which monitors a computer system and relates to an on-line monitoring system which detects a functional fault or the fall in processing efficiency of on-line applications, which operate on the computer system, promptly or before it occurs.

2. Related Background Art

An operating system C is introduced into a computer system as shown in FIG. 3 in order to unify and effectively run hardware A including a central processing unit 1, a channel unit 2 and an input/output unit 3, and software (system program) B in a memory unit including various on-line control programs 4, a data base 5 and a network access method program 6.

The operating system C has various functions but representative functions are, for example, a process control function for monitoring/controlling a job of the computer system, a CPU schedule control function for optimally arranging the execution time of the computer when a plurality of programs runs at the same time, a storage area control function for effectively storing executable programs into the storage area which has the memory capacity limit, and a communication control function for transferring actual instructions or processing results.

In these functions, a function mainly relating to the monitoring of the computer system is the storage area control function which forms a storage space which is an execution area with a main memory and a sub memory and controls reading or sheltering of the program. According to the storage area control function, when a command is inputted to the operating system from a console of the computer system, a table of programs which exist in the storage space is instantaneously obtained.

Then, conventionally, in order to monitor the application which operates on the operating system, using this function, a fault detecting method (see Japanese Patent Laid-Open No. 62-233855 (233855/1987)), which checked whether the application program, which was an object to be monitored, existed on the storage space following the aforesaid command input and if the application program existed, decided that the system operated normally and on the contrary, if the application program did not exist, decided that some fault occurred the system, was generally applied.

However, in the aforesaid fault detecting method, occurrence of the application fault was judged only by checking whether the application program, which was an object to be monitored, existed on the storage space, so that it could not detect whether the application actually operated normally. Consequently, although formally any fault was not found, practically the application fault existed, so that, for example, if the user tried to use the application, some inconvenience was caused such that th application was unavailable. Therefore, one problem is that computer system reliability was not sufficiently maintained.

Further, another problem is that in the aforesaid fault detecting method, if the application programs were loaded heavily and multi users used the programs, other faults such that processing period lasted extremely long could not be detected.

SUMMARY OF THE INVENTION

The present invention is accomplished to solve the above conventional problems. It is an object of the present invention to provide an on-line monitoring system which can detect faults which deteriorate functions or the fall in processing efficiency of various on-line applications, promptly or before it occurs.

In order to achieve the above purpose, according to the present invention, an on-line monitoring system which detects faults of one or more applications of the computer system comprises monitoring means for instructing each on-line control means included in the applications to execute routine processing for application programs periodically, and in a case that the time required for the routine processing is longer than a predetermined time, the monitoring system decides that a fault which deteriorates application functions or a fall in processing efficiency occurs.

According to the present invention comprising such configuration, the monitoring means instructs each on-line control means included in a plurality of applications to execute the routine processing for application programs periodically, and in the case that the time required for the routine processing is longer than a predetermined time, the monitoring system decides that a fault which deteriorates application functions or a fall in processing efficiency occurs, so that the large fault is treated before it is conspicuous.

The present invention will become more fully understood from the detailed description given hereinbelow and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DETAILED DESCRIPTION OF THE PREFERRED EMBODIMENTS

One embodiment of the present invention will be explained hereinafter with reference to the drawings. First, the configuration of a processing monitoring system will be explained based on FIG. 1. Note that various means described hereinafter are the job done by programs, and a schedule of these job is controlled by an operating system of a computer system 10.

The computer system 10 comprises a plurality of kinds of applications (operating with an application program or a hardware) $J_1, J_2, \ldots, J_n$ such as an application which processes a company's accounting or an application which processes a receipt of order from customers, and each application $J_1, J_2, \ldots, J_n$ comprises an on-line control means for controlling each application.

Figure 1:
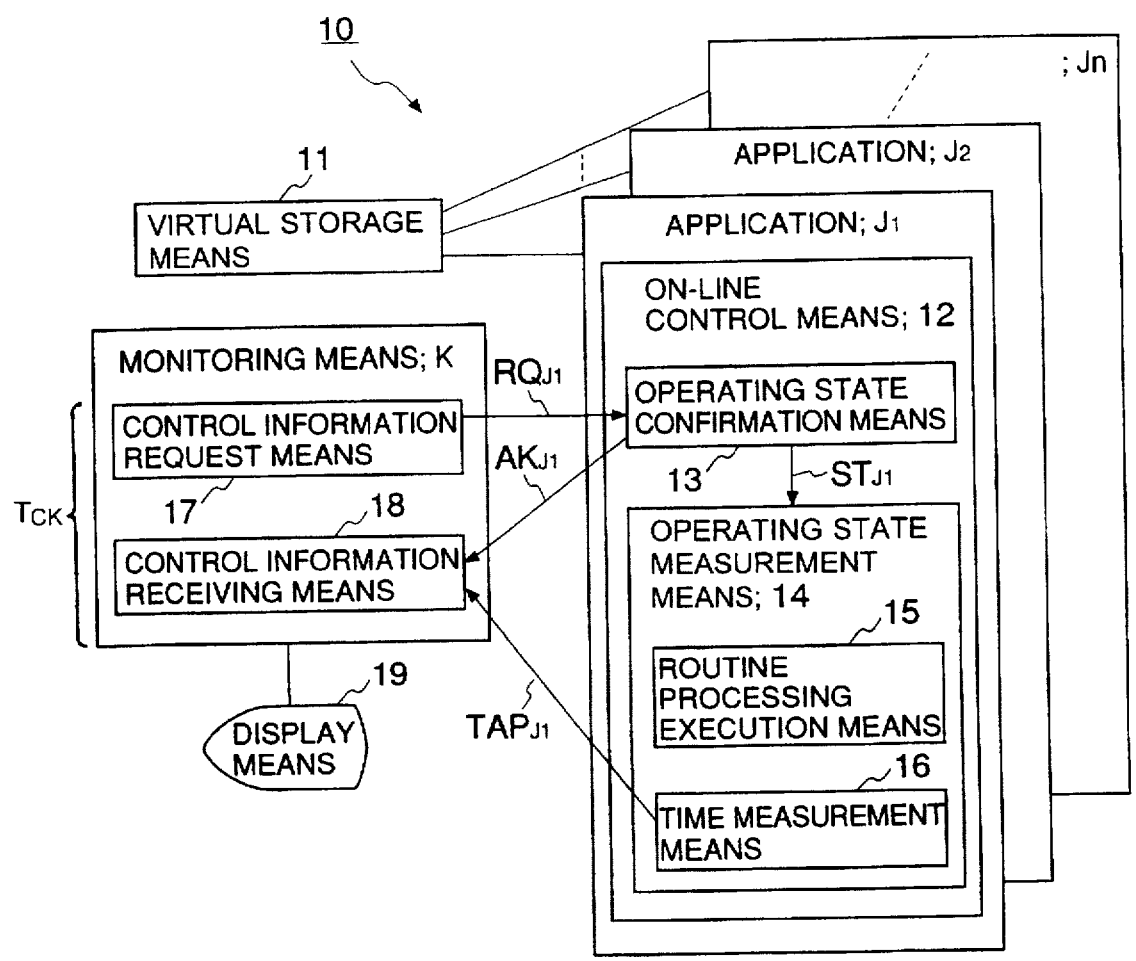
FIG. 1 is a system configuration view showing the configuration of an on-line monitoring system according to the one embodiment of the present invention.

The application $J_1$ shown in FIG. 1 will be explained. When the computer system 10 is started, the on-line control means 12, which is constituted in a virtual storage space by a virtual storage means 11, exists, and the on-line control means 12 controls the application $J_1$. The other applications $J_2, \ldots, J_n$ are also controlled by each on-line control means (not shown in FIG. 1), which is constituted in the virtual storage space by the virtual storage means 11.

Full details will be described later but the on-line control means 12 comprises an operating state confirmation means 13, and an operating state measurement means 14, and further the operating state measurement means 14 comprises a routine processing execution means 15, and a time measurement means 16. The remaining applications $J_2, \ldots, J_n$ comprise the same means as these means.

A host computer comprises a monitoring means K for monitoring the on-line control means existing in the applications $J_1, J_2, \ldots, J_n$. The monitoring means K comprises a control information request means 17 for issuing predetermined request information to each on-line control means at every predetermined cycle $T_{ck}$ to instruct the on-line control means to send back response (acknowledgement) information which indicates that the request information received and time information which will be described later, and a control information receiving means 18 for receiving the control information and the time information and based on this information, deciding whether there is an application having some fault. In other words, the monitoring means K comprises a passive monitoring function which monitors each on-line control means in order at every cycle $T_{ck}$.

The active monitoring functions of the monitoring means K for the on-line monitoring means 12 will be explained. In a case of timing to monitor the application $J_1$, first the control information request means 17 transmits request information $RQ_{J1}$ as an instruction to the operating state confirmation means 13. Then, the control information receiving means 18 receives the acknowledgement information $Ak_{J1}$ which is sent back from the operating state confirmation means 13 and the time information $TAP_{J1}$ which is transmitted from the time measurement means 16.

Further, the control information receiving means 18 processes the following three kinds of decision. That is when the acknowledgement information $AK_{J1}$ is not received within the predetermined reference acknowledgement time $\tau_{AK}$ elapsing from the time $t_1$ at which the request information $RQ_{J1}$ is issued, the control information receiving means 18 decides that some disorder/fault occurs in the on-line control means 12, and then a display means 19 displays that some disorder/fault occurs. Next, comparing the predetermined reference routine processing time $\tau_{AP}$ with the time information $TAP_{J1}$, the control information receiving means 18 decides that the application $J_1$ is normal when satisfying a relation $TAP_{J1} < \tau_{AP}$, and decides that some disorder/fault occurs in the application $J_1$ when satisfying a relation $TAP_{J1} \geq \tau_{AP}$ and the display means 19 displays that some disorder/fault occurs. Moreover, if the time information $TAP_{J1}$ is not sent back within the predetermined wait period $\tau_{RCV}$ (relation is $\tau_{AK} + \tau_{AP} < \tau_{RCV} < T_{CK}$), the control information receiving means 18 decides that some disorder/fault occurs in the on-line control means 12 and the display means 19 displays some disorder/fault occurs.

Next, the on-line control means 12 will be explained in detail. Once the operating state confirmation means 13 receives the request information $RQ_{J1}$, it immediately sends back the acknowledgement information which indicates the receipt of information to the control information receiving means 18, and at the same time, using the sending back time $t_s$ as a parameter of the routine processing start, it generates starting information $ST_{J1}$ for starting up the operating state measurement means 14.

Once the operating state measurement means 14 receives the starting information $ST_{J1}$, it makes the time measurement means 16 hold the sending back time $t_s$ and start the time measurement. At the same time, it makes the routine processing execution means 15 start the routine processing.

The routine processing execution means 15 operates at command of the operating state measurement means 14, and performs the routine processing to the application program of the application $J_1$. Note that the routine processing at least includes processing of a required function which is always used in the application program, for example, the application program relating to the order receiving processing processes data transfer with a database. Therefore, processing of other functions may be further included in the routine processing in accordance with the monitoring specification of the computer system 10.

The time measurement means 16 holds the sending back time $t_s$, measures the time $t_E$ at which the routine processing execution means 15 completes the routine processing and calculates the time required $TAP_{J1}$ ($=t_E-t_s$) which takes in all routine processing. Further, the time measurement means 16 transmits the time information $TAP_{J1}$ to the control information receiving means 18. That is, the time measurement means 16 has a function which reports the processing ability index at this point as the time information $TAP_{J1}$ to the monitoring means K.

Figure 2:
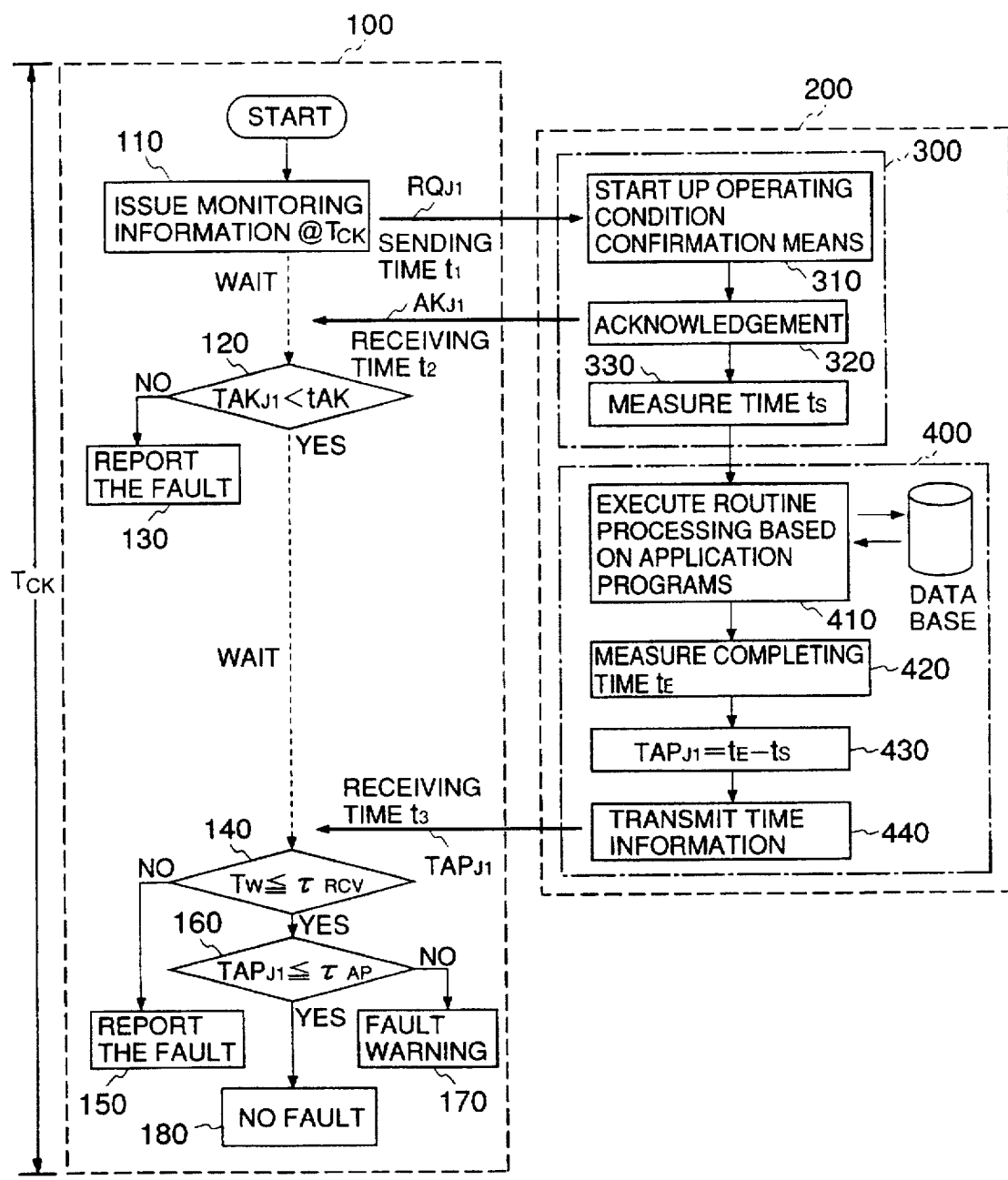
FIG. 2 is a flowchart for explaining effects of one embodiment.
Figure 3:
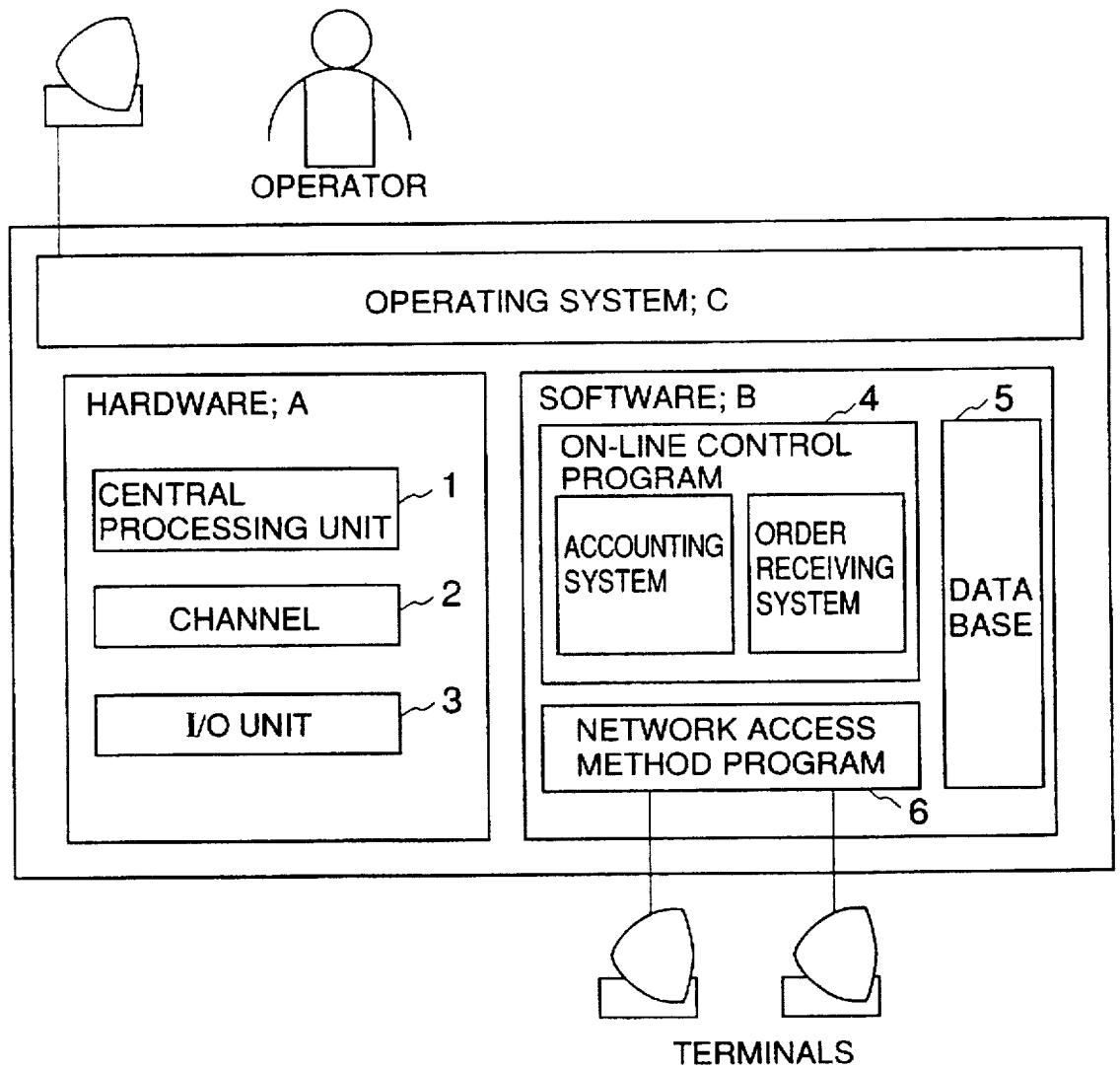
FIG. 3 is a system configuration view showing the configuration of a prior art computer system schematically.

Next, the operation of the present embodiment having such configuration will be explained based on a flowchart shown in FIG. 2. Note that effects between the monitoring means K and the on-line control means 12 will be compared and explained. Further, in FIG. 2, a step indicated by a reference numeral 100 is processing of the monitoring means K of FIG. 1, a step indicated by a reference numeral 200 is processing of the on-line control means 12, a step indicated by a reference numeral 300 is processing of the operating state confirmation means 13, and a step indicated by a reference numeral 400 is processing of the operating state measurement means 14.

First, once the monitoring means K starts the monitoring operation, it actively monitors each on-line control means of the applications $J_1, J_2, \ldots, J_n$ in order at every predetermined cycle $T_{CK}$.

Then, in a case of timing to monitor the on-line control means 12, in step 110, the control information request means 17 issues the request information $RQ_{J1}$ and sends this information $RQ_{J1}$ with a form of command data to the operating state confirmation means 13, and the control information receiving means 18 holds the sending time $t_1$, and becomes the wait state for receiving the acknowledging signal $AK_{J1}$ from the operating state confirmation means 13.

Next, in step 310, the operating state confirmation means 13 starts up if it receives the request information $RQ_{J1}$, and in next step 320, the operating state confirmation means 13 sends back the acknowledging signal $AK_{J1}$ to the control information receiving means 18. Further, the operation state confirmation means 13, in step 330, measures the sending back time $t_s$, and transmits the starting information $ST_{J1}$ in which the sending back time $t_s$ is a parameter of the routine processing start to the operating state measurement means 14.

On the other hand, in step 120, if the acknowledgement information $AK_{j1}$ is not received even though the predetermined reference acknowledgment time $\tau_{AK}$ elapses from the sending time $t_1$ of the monitoring information $RQ_{j1}$, the control information receiving means 18 decides that some fault occurs in the on-line control means 12. Further, in step 130, the control information receiving means 18 makes the display means 19 display that some fault occurs, thereby it reports the fault to the operator through the display means 19. On the other hand, in step 120, if the time required $T_{AK}$ (=$t_2$-$t_1$) for acknowledgement from the sending time $t_1$ to the receiving time $t_2$ satisfies a relation $T_{AK}<\tau_{AK}$, the control information receiving means 18 decides that the application is normal, and becomes wait state for receiving next time information $TAP_{j1}$.

In step 400 during the wait state for receiving, the following processing proceeds concurrently. That is, in step 330, once the operating state measurement means 14 receives the starting information $ST_{j1}$, it makes the time measurement means 16 hold the sending back time $t_s$ and start performing the time measurement processing at the same time. Then, in step 410, the operating state measurement means makes the routine processing execution means 15 perform the routine processing.

Next, once the routine processing is completed, the time measurement means 16, in step 420, measures the completing time $t_E$ of the routine processing and next in step 430, calculates the time difference $TAP_{j1}$ (=$t_E$-$t_s$) between the completing time $t_E$ and the time $t_s$, whereby the time information $TAP_{j1}$ which takes in the routine processing is obtained. Then, in step 440, the time information $TAP_{j1}$ is transmitted to the control information receiving means 18.

Then, the control information receiving means 18 which has been on the wait state receives the time information $TAP_{j1}$.

Note that the control information receiving means 18 decides, in step 140, that the time information $TAP_{j1}$ is not received at time $t_3$ within the waiting time $\tau_{RCV}$ elapsing from the receiving time $t_2$, and in step 150, the control information receiving means 18 instructs the display means 19 to display that some fault occurs in the on-line control means 12.

On the other hand, when the time $T_w$ (=$t_3$-$t_2$) from the receiving time $t_2$ to the time $t_3$ at which the time information $TAP_{j1}$ is received is $T_w \leq \tau_{RCV}$, processing proceeds to step 160 from step 140.

Next, in step 160, comparing the predetermined routine processing reference time $\tau_{AP}$ with the time information $TAP_{j1}$, when satisfying a relation $TAP_{j1}>\tau_{AP}$, the control information receiving means 18 decides that a functional fault or a fall in processing efficiency occurs in the application $J_1$. Then, in step 170, the control information receiving means 18 instructs the display means to display the indication of warning of fault occurred. On the other hand, when satisfying a relation $TAP_{j1} \leq \tau_{AP}$, the control information receiving means 18 decides that the application $J_1$ is normal and proceeds to step 180, with instructing the display means 19 to display that the application is normal or the time information $TAP_{j1}$ or without displaying any indication. Monitoring processing for next application $J_2$ then proceeds. Then, the remaining applications $J_2, \ldots, J_n$ are monitored in the same manner, and further this monitoring processing is repeated in order at every cycle $T_{ck}$, so that all applications $J_1, J_2, \ldots, J_n$ are monitored successively.

Thus, according to the embodiment, differing from the conventional monitoring method which decides whether the application is normal only by checking whether plural application programs exist, the on-line monitoring system of the embodiment decides the application is normal if the time required is shorter than the predetermined reference processing time, so that it can accurately detect whether the application normally operates. Further, faults which occur while the application programs are heavily loaded and plural users use the programs can also be detected.

Most attracting point of the embodiment is that since the executing time required for the routine processing is measured, the fall in the processing ability (that is, the fall in processing speed) can accurately be detected and treated before a large fault is conspicuous.

Further, before the monitoring system decides whether the fault occurs in the application, it instructs the operating state confirmation means 13 to send the acknowledgement information back, and then the monitoring system decides that some fault occurs if the acknowledgement information is not sent back within the predetermined reference acknowledgement time, so that the monitoring system can also detect whether the fault occurs in the on-line monitoring means.

Moreover, since the monitoring system is for general purposes, it can be applied to the computer system constituted by various algorithms.

From the invention thus described, it will be obvious that the invention may be varied in many ways. Such variations are not to be regarded as a departure from the spirit and scope of the invention, and all such modifications as would be obvious to one skilled in the art are intended to be included within the scope of the following claims.

What is claimed is:

1. An on-line monitoring system for a computer system, for detecting faults and deterioration of applications being executed on the computer system, comprising:
   (a) on-line control means provided to each application in a virtual storage of the computer system, said on-line control means including routine process execution means for executing routine processes, and time measurement means for measuring a transit time between start and finish times for processing such routine processes;
   (b) monitoring means having requesting means for periodically transmitting instructions to the on-line control means of each application requesting to start a routine process within such application, and responsive to said instruction, the on-line control means measuring a transit time between start and finish times for processing such routine process and transmitting to the monitoring means information indicating the transit time;
   (c) determining means included in the monitoring means for receiving said information indicating the transit time and determining whether or not the received transit time exceeds a predetermined time period each application would take to execute the routine process when executing normally; and
   (d) display means, coupled to the monitoring means, for displaying fault or deterioration of each application when the monitoring means determines that the transit time for such application exceeds the predetermined time period.

2. The on-line monitoring system as provided in claim 1, wherein said determining means determines that the on-line control means has a fault when response from the application is not received within a second predetermined time period.

3. A method for detecting faults or deterioration of applications running on a computer system, comprising the steps of:

(a) providing each application with on-line control means in a virtual storage of the computer system;

(b) periodically making each application execute at least one predetermined routine which takes less than a predetermined time for normal execution;

(c) measuring the time that each application takes to execute said predetermined routine process; and (d) determining that an application has deteriorated or has faults based on the time measured in step (c).

4. A method as defined in claim 3, further including the step of displaying when an application is determined to have deteriorated or have faults in the comparing step.

* * * * *